(12) United States Patent  
Srinivasan et al.

(10) Patent No.: US 12,174,809 B1  
(45) Date of Patent: Dec. 24, 2024

(54) SYSTEM AND METHOD FOR DETERMINING APPLICATION DEGRADATION USING ADVANCED COMPUTATIONAL MODELS FOR DATA ANALYSIS AND AUTOMATED DECISION-MAKING

(71) Applicant: BANK OF AMERICA CORPORATION, Charlotte, NC (US)

(72) Inventors: Yadava Krishnan Srinivasan, Telangana (IN); Karthikeyan Krishnan, Chennai (IN); Vikas Kumar Sahu, Telangana (IN); Avinash Basavant Nigudkar, Mumbai (IN); Param Jabbal, Frisco, TX (US); Muthuraj Kumaresan, Singapore (SG); Mukesh Kumar Jain, Jacksonville, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/225,309

(22) Filed: Jul. 24, 2023

(51) Int. Cl.  
*G06F 16/21* (2019.01)  
*G06F 16/2452* (2019.01)  
*G06F 16/25* (2019.01)

(52) U.S. Cl.  
CPC ...... *G06F 16/217* (2019.01); *G06F 16/24524* (2019.01); *G06F 16/252* (2019.01)

(58) Field of Classification Search  
CPC . G06F 16/217; G06F 16/24524; G06F 16/252  
USPC .......................................................... 707/802  
See application file for complete search history.

(56) References Cited

U.S. PATENT DOCUMENTS

| | | | |
|---|---|---|---|
| 7,546,333 B2 * | 6/2009 | Alon | H04L 67/1097 |
| | | | 709/200 |
| 7,958,393 B2 | 6/2011 | Bobak | |
| 8,326,910 B2 | 12/2012 | Bobak | |
| 8,341,014 B2 | 12/2012 | Bobak | |
| 8,346,931 B2 | 1/2013 | Bobak | |
| 8,365,185 B2 | 1/2013 | Bobak | |
| 8,375,244 B2 | 2/2013 | Bobak | |
| 8,428,983 B2 | 4/2013 | Bobak | |
| 8,447,859 B2 | 5/2013 | Bobak | |
| 8,677,174 B2 | 3/2014 | Bobak | |
| 8,682,705 B2 | 3/2014 | Bobak | |
| 8,751,283 B2 | 6/2014 | Bobak | |

(Continued)

*Primary Examiner* — Hicham Skhoun  
(74) *Attorney, Agent, or Firm* — Moore & Van Allen PLLC; William Walters

(57) ABSTRACT

Systems, computer program products, and methods are described herein for determining application degradation using advanced computational models for data analysis and automated decision-making. The present disclosure is configured to receive one or more applications, wherein the one or more applications comprise one or more access paths; update the one or more access paths, wherein updating the one or more access paths comprises reconfiguring details associated with the access paths; create, in response to updating the one or more access paths, updated access paths; determine that the one or more updated access paths experience one or more application degradations; and implement one or more degradation solutions for the one or more application degradations to an artificial intelligence model.

17 Claims, 7 Drawing Sheets

(56) References Cited

U.S. PATENT DOCUMENTS

| | | |
|---|---|---|
| 8,763,006 B2 | 6/2014 | Bobak |
| 8,775,591 B2 | 7/2014 | Bobak |
| 8,782,662 B2 | 7/2014 | Bobak |
| 8,826,077 B2 | 9/2014 | Bobak |
| 8,868,441 B2 | 10/2014 | Bobak |
| 8,990,810 B2 | 3/2015 | Bobak |
| 9,558,459 B2 | 1/2017 | Bobak |
| 2005/0050271 A1* | 3/2005 | Honda ............... G06F 3/0635 711/114 |
| 2009/0171703 A1 | 7/2009 | Bobak |
| 2009/0171730 A1 | 7/2009 | Bobak |
| 2012/0254482 A1* | 10/2012 | Kabakura ........... G06F 3/0614 710/38 |
| 2019/0147371 A1* | 5/2019 | Deo ................... G06N 20/20 706/12 |
| 2019/0354621 A1* | 11/2019 | Wang ................ G06F 16/2453 |
| 2021/0232551 A1* | 7/2021 | Li ..................... G06F 11/3452 |
| 2021/0286784 A1* | 9/2021 | Chen ................ G06N 20/00 |
| 2022/0188308 A1* | 6/2022 | Sun .................. G06N 20/00 |

\* cited by examiner

SYSTEM AND METHOD FOR DETERMINING APPLICATION DEGRADATION USING ADVANCED COMPUTATIONAL MODELS FOR DATA ANALYSIS AND AUTOMATED DECISION-MAKING

TECHNOLOGICAL FIELD

Example embodiments of the present disclosure relate to determining application degradation using advanced computational models for data analysis and automated decision-making.

BACKGROUND

Determining application degradation can pose significant challenges. Applicant has identified a number of deficiencies and problems associated with determining application degradation using advanced computational models for data analysis and automated decision-making. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for determining application degradation using advanced computational models for data analysis and automated decision-making.

Embodiments of the present invention address the above needs and/or achieve other advantages by providing apparatuses (e.g., a system, computer program product, and/or other devices) and methods for determining application degradation using advanced computational models for data analysis and automated decision-making. The system embodiments may comprise a processing device and a non-transitory storage device containing instructions when executed by the processing device, to perform the steps disclosed herein. In computer program product embodiments of the invention, the computer program product comprises a non-transitory computer-readable medium comprising code causing an apparatus to perform the steps disclosed herein. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the steps disclosed herein.

In some embodiments, the present invention receives one or more applications, wherein the one or more applications comprise one or more access paths. In some embodiments, the present invention updates the one or more access paths, wherein updating the one or more access paths comprises reconfiguring details associated with the access paths. In some embodiments, the present invention creates, in response to updating the one or more access paths, updated access paths. In some embodiments, the present invention determines that the one or more updated access paths experience one or more application degradations. In some embodiments, the present invention implements one or more degradation solutions for the one or more application degradations to an artificial intelligence model.

In some embodiments, determining that the updated access paths experience one or more application degradations further comprises: comparing the one or more access paths and the one or more updated access paths; identifying the one or more access paths that experience the one or more application degradations; and determining the one or more degradation solutions for the one or more application degradations.

In some embodiments, comparing the one or more access paths and the one or more updated access paths further comprises: receiving historical performance characteristics associated with the one or more access paths; receiving performance characteristics associated with the one or more updated access paths; and comparing the historical performance characteristics and the performance characteristics.

In some embodiments, receiving the one or more applications comprises transferring the one or more applications from a production environment to a development environment.

In some embodiments, the present invention deploys the artificial intelligence model into the production environment.

In some embodiments, the present invention trains, on a regular interval, the artificial intelligence model.

In some embodiments, the present invention determines an amount of resources required to implement the one or more degradation solutions; and conserves one or more resources associated with implementing the one or more degradation solutions to the artificial intelligence model.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
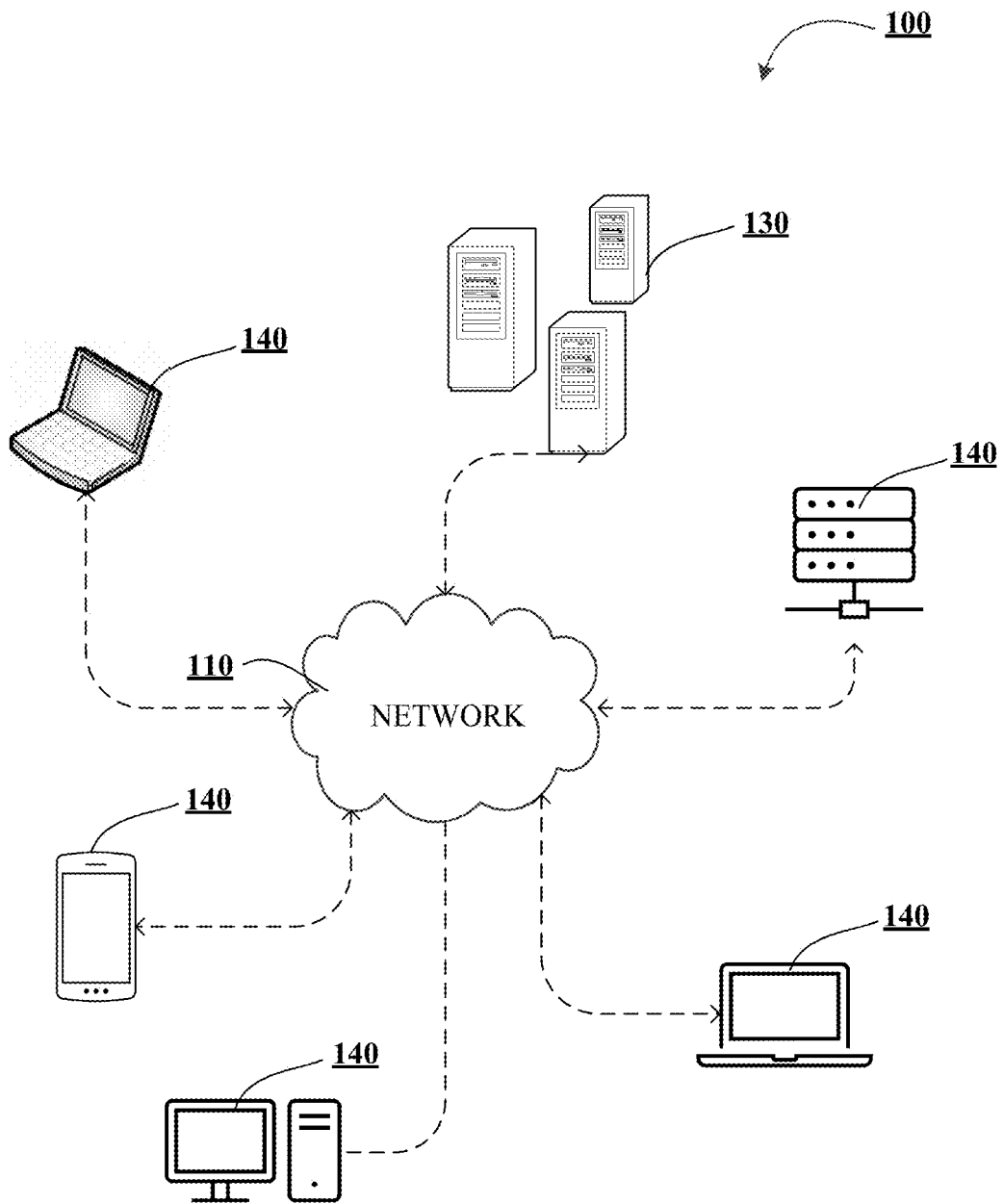
Figure 1B:
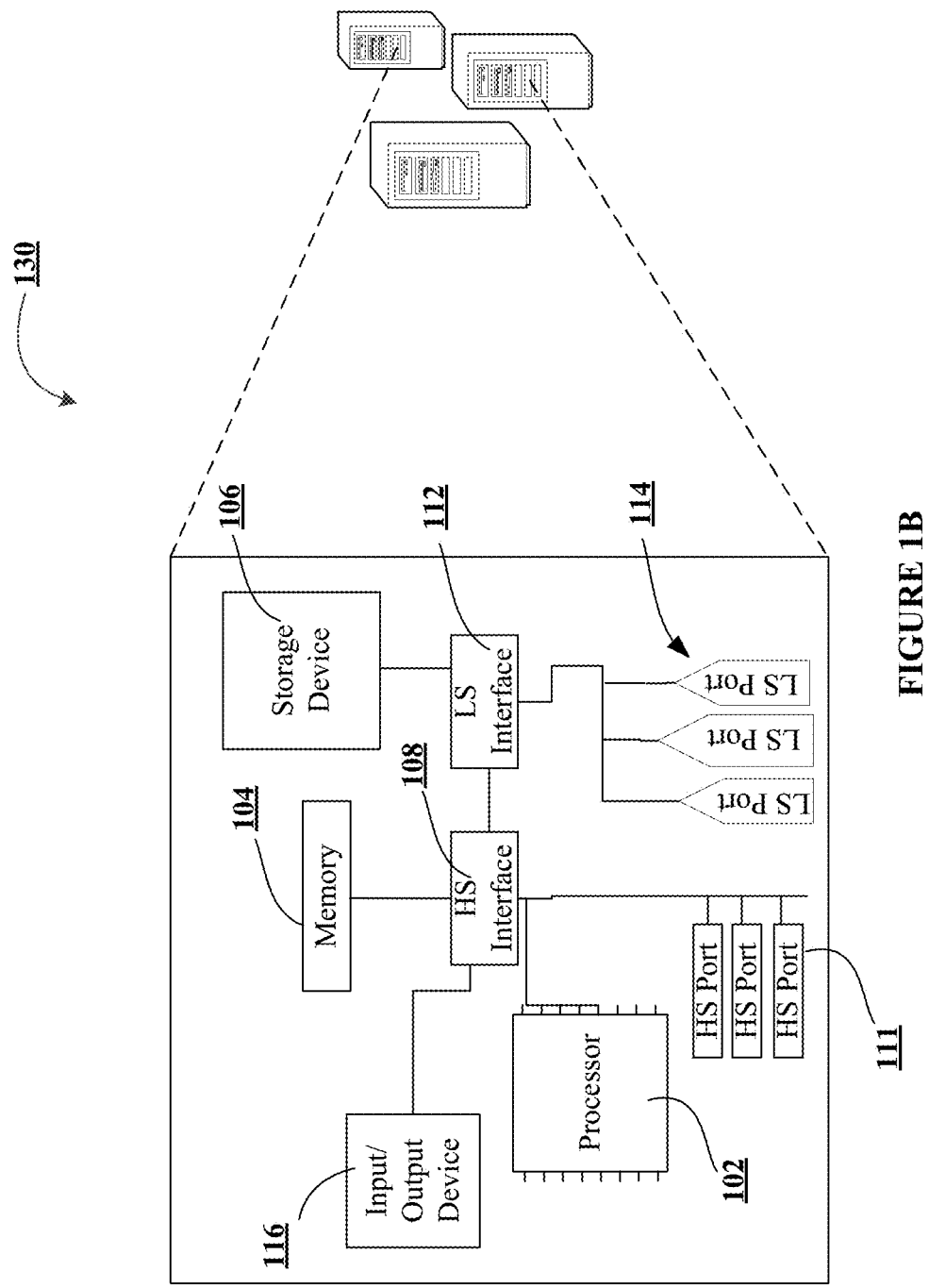
Figure 1C:
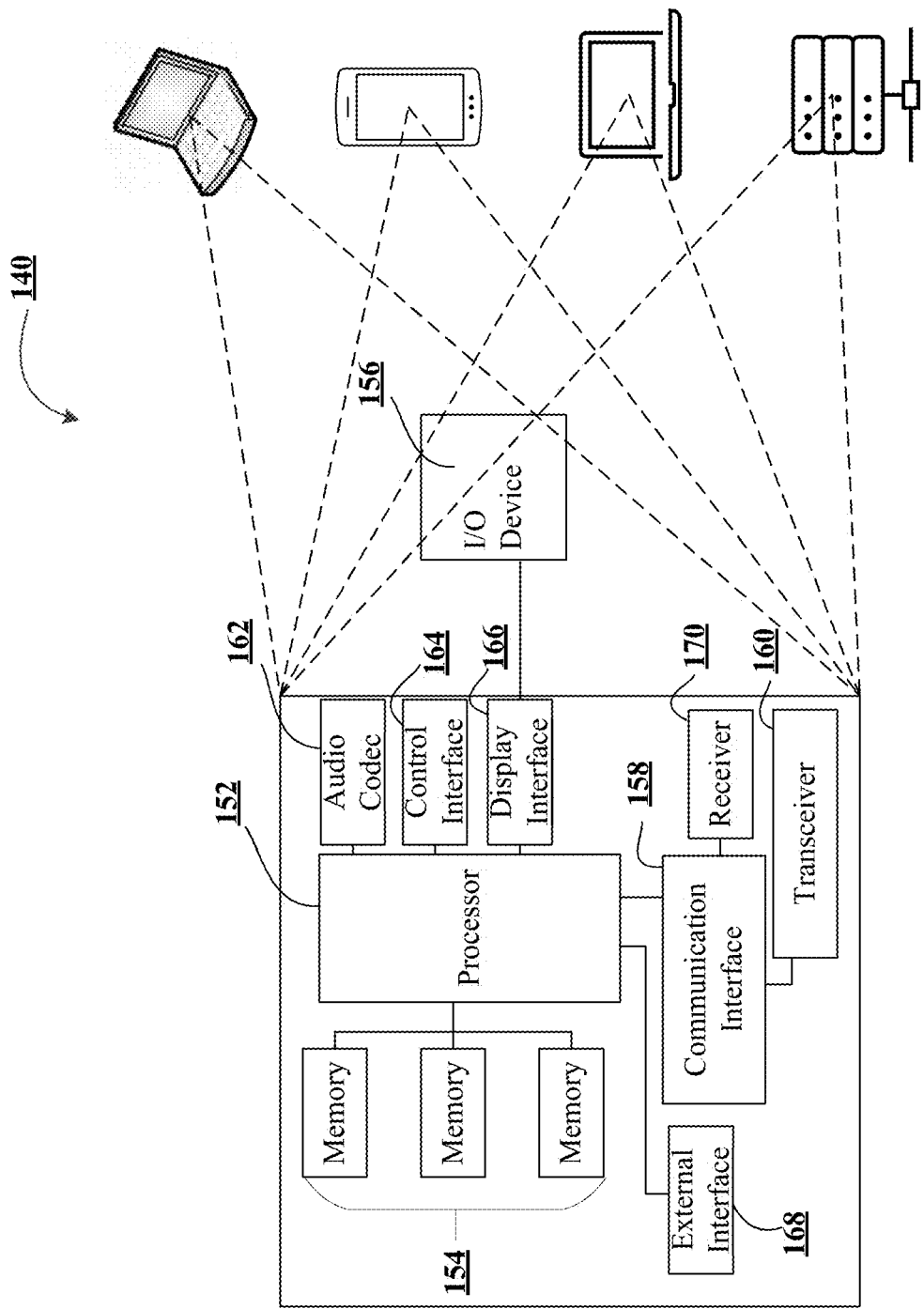
Figure 2:
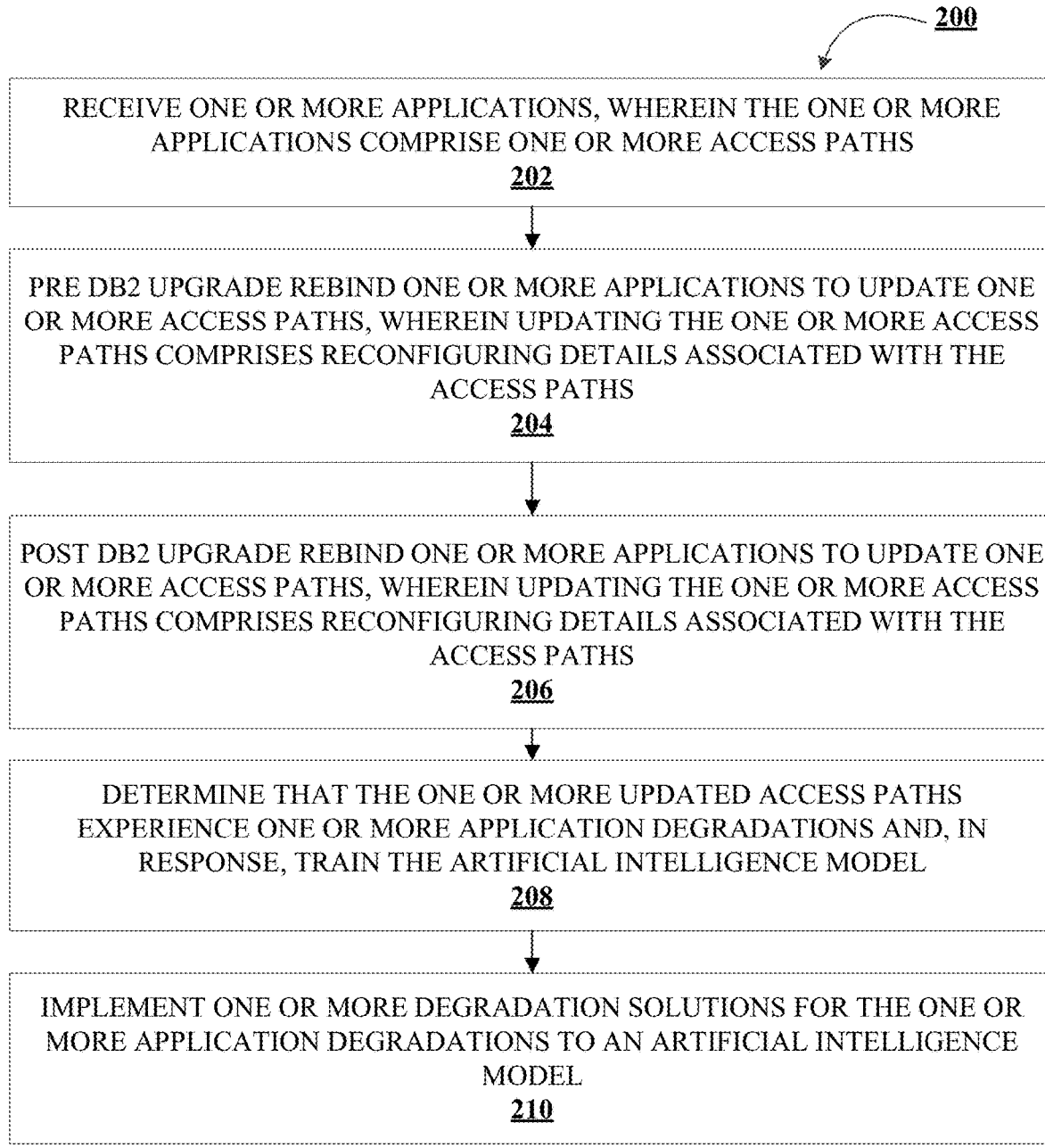

FIGS. 1A-1C illustrates technical components of an exemplary distributed computing environment for determining application degradation using advanced computational models for data analysis and automated decision-making, in accordance with an embodiment of the disclosure;

FIG. 2 illustrates a process flow for implementing one or more degradation solutions for one or more application degradations to an artificial intelligence model, in accordance with an embodiment of the disclosure.

Figure 3:
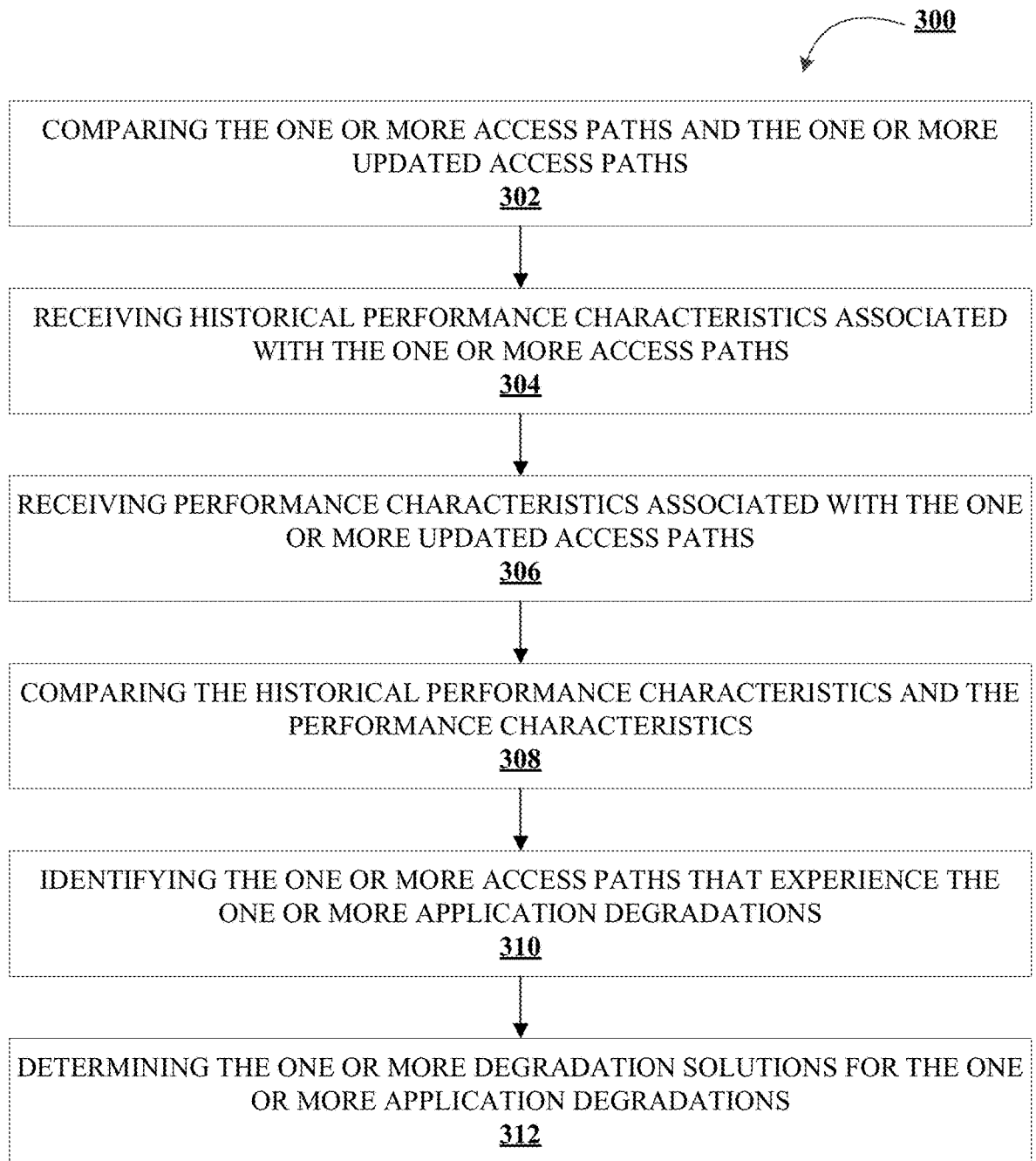

FIG. 3 illustrates a process flow for comparing historical performance characteristics and performance characteristics, in accordance with an embodiment of the disclosure.

Figure 4:
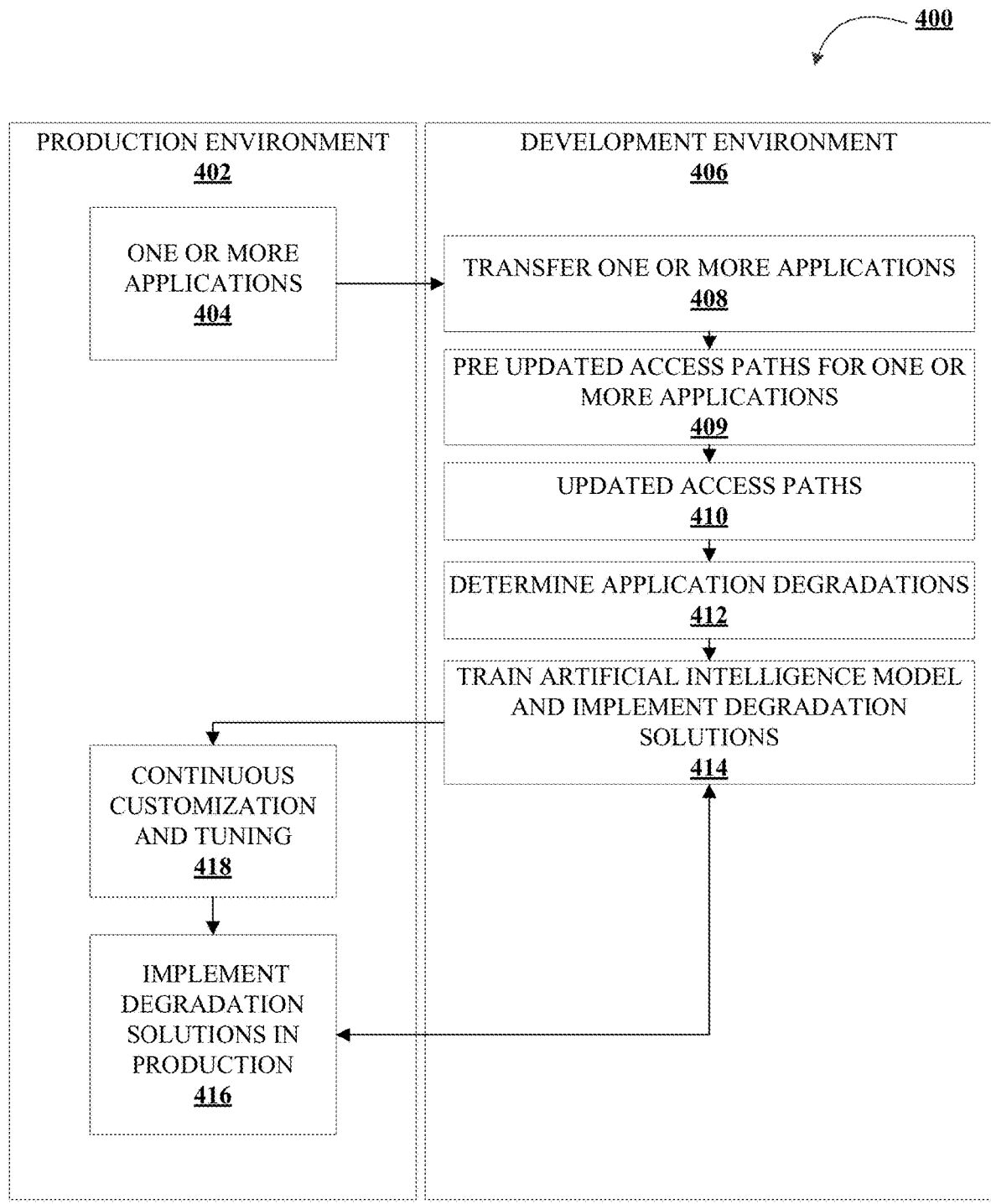

FIG. 4 illustrates a process flow of an example process associated with example embodiments described herein.

Figure 5:
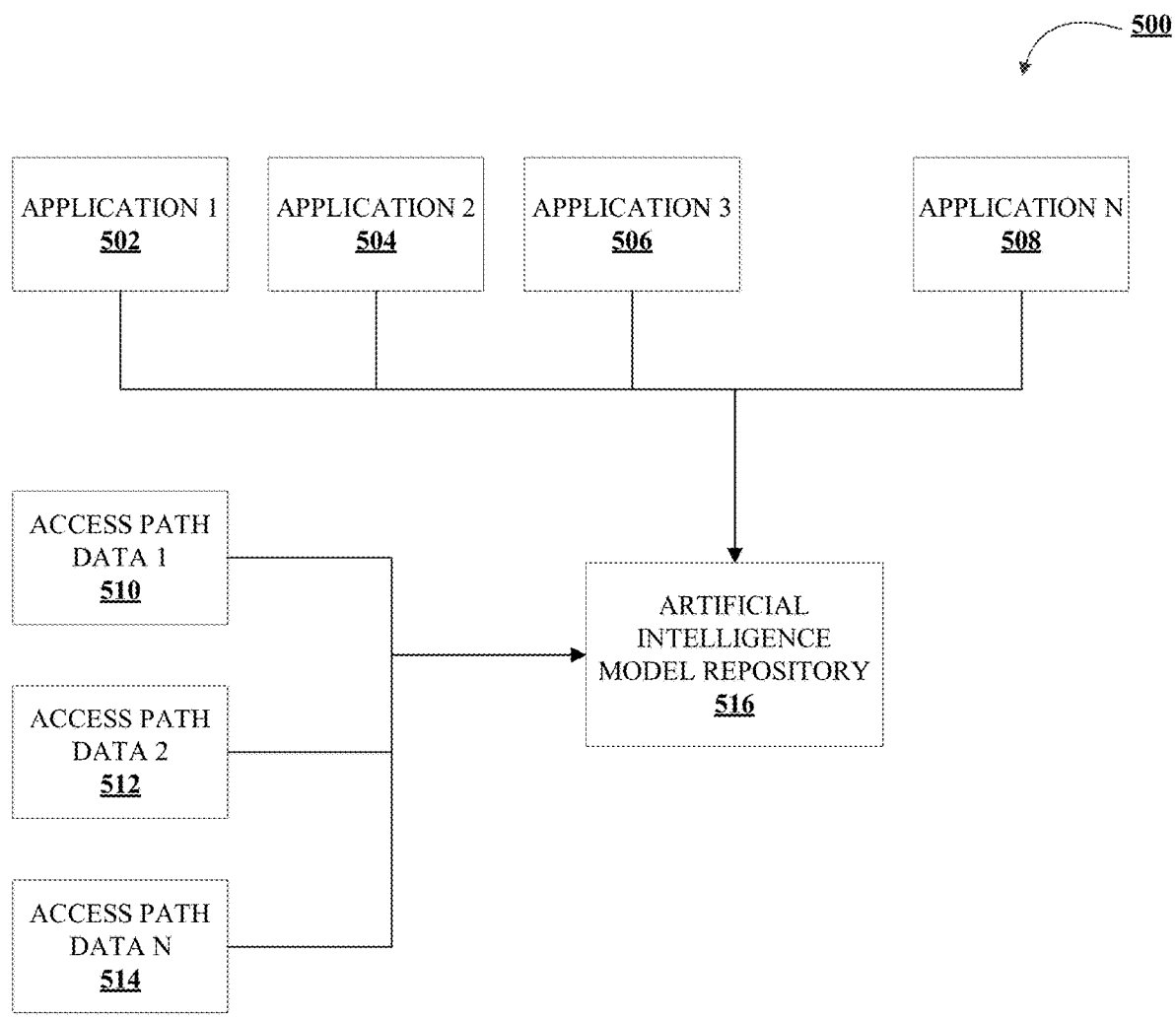

FIG. 5 illustrates a process flow of an example process associated with creating a repository to train the artificial intelligence model, in accordance with example embodiments described herein.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Complex business solutions require massive amounts of applications to run. These applications require substantial amounts of effort to maintain and correct when faced with degradation in the applications' performance. Specifically, when applications and access paths are upgraded to a new function level, the applications and access paths may experience a degradation in performance, which may lead to operational instability in the production environment. Currently, there is no solution to proactively eliminate any such degradations prior to an upgrade of the applications and access paths happening in a production environment.

In some embodiments, the degradation determination system may transfer programs from a production environment to a development environment. The programs may contain access path information, which may comprise instructions on how to retrieve requested data within the database. The degradation determination system may save a copy of the programs and their associated access path information. Then, the degradation determination system will upgrade the access path information (e.g., re-bind the access path information based on the program location changing). The degradation determination system will then save another copy of the programs and their updated access path information. The system will compare the pre-updated and post-update access path information (e.g., compare the performance statistics, which may relate to the amount of time it takes to load the programs based on their updated access path information). In response to comparing the pre- and post-updated access path information, the system will identify and determine which updated access paths are causing poor performance. The degradation determination system will then train an artificial intelligence model to correct the issues associated with the updated access paths causing issues.

What is more, the present disclosure provides a technical solution to a technical problem. As described herein, the technical problem includes determining application degradation using advanced computational models for data analysis and automated decision-making. The technical solution presented herein allows for accurate, effective, and efficient determination of application degradation. In particular, determining application degradation using advanced computational models for data analysis and automated decision-making is an improvement over existing solutions for determining application degradation, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for determining application degradation using advanced computational models for data analysis and automated decision-making 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, storage device 106, a high-speed interface 108 connecting to memory 104, high-speed expansion points 111, and a low-speed interface 112 connecting to a low-speed bus 114, and an input/output (I/O) device 116. The system 130 may also include a high-speed interface 108 connecting to the memory 104, and a low-speed interface 112 connecting to low-speed port 114 and storage device 106. Each of the components 102, 104, 106, 108, 111, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 may store information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router (e.g., through a network adapter).

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 156, 158, 160, 162, 164, 166, 168 and 170, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156 (e.g., input/output device 156). The display 156 may be, for example, a Thin-Film-Transistor Liquid Crystal Display (TFT LCD) or an Organic Light Emitting Diode (OLED) display, or other appropriate display technology. An interface of the display may include appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a Single In Line Memory Module (SIMM) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, near-field communication (NFC), and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

Further, communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications.

In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 is a process flow 200 which illustrates a process flow for implementing one or more degradation solutions for one or more application degradations to an artificial intelligence model, in accordance with an embodiment of the disclosure. The method may be carried out by various components of the distributed computing environment 100 discussed herein (e.g., the system 130, or one or more end-point device(s) 140, etc.). An example system may include at least one processing device and at least one non-transitory storage device containing instructions that, when executed by the processing device, causes the processing device to perform the method discussed herein.

In some embodiments, a degradation determination system (e.g., similar to one or more of the systems described herein with respect to FIGS. 1A-1C) may perform one or more of the steps of process flow 200. For example, a degradation determination system (e.g., the system 130 described herein with respect to FIGS. 1A-1C) may perform the steps of process flow 200.

As shown in block 202, the process flow 200 of this embodiment includes receiving one or more applications, wherein the one or more applications comprise one or more access paths. As used herein, one or more applications may refer to programs, catalog tables, applications, and/or the like. In some embodiments, the applications may refer to critical programs that may be used to train the artificial intelligence model.

As used herein, one or more access paths may refer to details of how the applications are accessed. In some embodiments, the access paths may include instructions on how to retrieve requested data. In some embodiments, the access paths may include data retrieval methods (e.g., how data will be retrieved from the database), join orders (e.g., sequence instructions for commands involving joining multiple tables of data), join methods (e.g., methods used for joining tables), access orders (e.g., instructions for ordering the processing of index keys), predicate evaluations (e.g., instructions for evaluating conditions in the request), sort operations (e.g., instructions on how sorting operations are handled), and/or the like. For instance, and by way of non-limiting example, the access paths may refer to where the applications are stored in a system (e.g., a computer, a server, a rack of servers, a mobile computing device, and/or the like). In this way, the access path provides information on how to access certain pieces of information, applications, programs, catalog tables, and/or the like. In some embodiments, the applications may refer to applications in relational databases such as Database 2 (DB2) and may include operational databases, data warehouses, data lakes, fast data, and/or the like. In some embodiments, the applications may be bound to a DB2 database.

In some embodiments, the degradation determination system may receive details (e.g., information) associated with the one or more access paths. In some embodiments, receiving details associated with the one or more access paths may include performing a table scan (e.g., scanning entire tables to find relevant data), performing an index scan (e.g., performing a scan based on the inputted query), multiple index access (e.g., combining results in response to accessing several indexes), indexed sequential access method (e.g., sequentially access records), and/or the like. In some embodiments, the applications may be in other types of relational database management systems (DBMS).

In some embodiments, the access paths may take a variety of forms or types. In some embodiments, the access paths may be Structured Query Language ("SQL") or the like which allow for inserting, deleting, and updating data.

In some embodiments, receiving the one or more applications may include transferring the one or more applications from a production environment to a development environment. As used herein, transferring may refer to moving the one or more applications from the production environment to the development environment. In some embodiments, this may include migrating any data associated with the applications, transferring the code, transferring the variables and configurations in the production environment, transferring the infrastructure, and/or the like. In some embodiments, the transfer may include transferring the applications in such a way as to replicate the production environment in the development environment.

As used herein, the production environment may refer to an environment where a final version of the degradation determination system operates. In some embodiments, the production environment may include an environment where the system is made available to users (e.g., end users) who input live data to the system. Further, the production environment may be an environment where no further experimental testing is performed on the system. Additionally, the production environment may be optimized for user (e.g., end user) performance and any live or real-world data the end user inputs into the system.

As used herein, the development environment may refer to an environment where users (e.g., technicians, managers, third parties, developers, coders, and/or the like) may make changes to the degradation determination system. In some embodiments, the development environment may include a controlled setting environment where the users may write, debug, test, configure, reconfigure, and/or the like, the degradation determination system. Further, the development environment may include Integrated Development Environments (IDEs), version control systems, debugging tools, and/or the like. In some embodiments, the development environment may include data that includes data prepared for testing, debugging, configuring, reconfiguring, and/or the like. In some embodiments, the applications may be transferred from the development environment to a staging environment (e.g., pre-production environment), a testing environment (e.g., for rigorous testing of the system), and/or the like.

As shown in block 204, the process flow 200 of this embodiment includes pre DB2 upgrade rebind one or more applications to update one or more access paths, wherein updating the one or more access paths comprises reconfiguring details associated with the access paths. In some embodiments, the pre DB2 upgrade rebind may include the pre-updated access paths (e.g., access paths that have not been updated). In some embodiments, the pre-updated access paths may be in a DB2 database. In some embodiments, upgrading the one or more applications may include updating the one or more applications. In some embodiments, upgrading the one or more applications may including updating the one or more applications and associated access paths.

As used herein, "pre DB2 upgrade" may refer to an application, access path, or the like that has not been upgraded in a database management environment (e.g., a DB2 environment). As used herein, a "rebind" may include re-binding (e.g., re-associating) an application with different access path details. In some embodiments, the rebound access path details may consume fewer resources when using the access path. In some embodiments, a pre DB2 upgrade rebind may include rebinding (e.g., re-associating) an application (e.g., a catalog table) with an upgraded (e.g., updated) access path.

In some embodiments, the degradation determination system may update the one or more access paths, wherein updating the one or more access paths comprises reconfiguring details associated with the access paths. As used herein, updating may refer to upgrading the access paths and associated details. In some embodiments, updating (e.g., upgrading, reconfiguring, and/or the like) may include reconfiguring the access path details in a way to update the instructions on how to find and locate the application associated with the access path. In some embodiments, updating may refer to re-binding the applications to the DB2 database. In this way, the application and associated access path details may be updated (e.g., upgraded, reconfigured, and/or the like) to a different access path. In some embodiments, updating the access paths may include choosing an efficient access path in response to current statistics of the data associated with the access path performance.

As shown in block 206, the process flow 200 of this embodiment includes post DB2 upgrade rebind one or more applications to update one or more access paths, wherein updating the one or more access paths comprises reconfiguring details associated with the access paths. In some embodiments, the post DB2 upgrade rebind may include the post-updated access paths (e.g., access paths that have been updated). In some embodiments, the post-updated access paths may be in a DB2 database. In some embodiments, upgrading the one or more applications may include updating the one or more applications. In some embodiments, upgrading the one or more applications may including updating the one or more applications and associated access paths.

As used herein, "post DB2 upgrade" may refer to an application, access path, or the like that has been upgraded in a database management environment (e.g., a DB2 environment). As used herein, a "rebind" may include re-binding (e.g., re-associating) an application with different access path details. In some embodiments, the rebound access path details may consume fewer resources when using the access path. In some embodiments, a post DB2 upgrade rebind may include rebinding (e.g., re-associating) an application (e.g., a catalog table) with an upgraded (e.g., updated) access path.

In some embodiments, the degradation determination system may create, in response to updating the one or more access paths, updated access paths. As used herein, updated access paths may refer to the access paths that have been updated (e.g., upgraded, reconfigured, and/or the like). In some embodiments, the updated access paths may refer to the updated location for where the applications are located. For instance, and by way of non-limiting example, an application may have a first access path which designates its location within a storage device. The application's first access path may be updated to a second access path in response to the system experiencing a DB2 rebind. The application's access path details may be reconfigured to reduce the amount of resources required to follow the first access path instructions. In other words, the updated second access path may contain instructions that reduce consumption of resources when accessing the application.

As shown in block 208, the process flow 200 of this embodiment includes determining that the one or more updated access paths experience one or more application degradations and, in response, training the artificial intelligence model. As used herein, application degradations may refer to any degradations associated with the applications. In some embodiments, the application degradations may refer to a reduction in performance (e.g., requiring significantly more time to execute or the like), increase in resource consumption (e.g., increased computer processing resources, input/output operations, memory consumption, network resources, and/or the like), locking issues (e.g., lock contention, suspension, deadlock, timeout and/or the like), stability issues (e.g., unpredictable system behavior in response to different loads or unexpected queries), accuracy issues (e.g., impacting accuracy of query results in response to the updated access paths), and/or the like.

For instance, and by way of non-limiting example, if an access path (e.g., non-updated access path) results in the system taking 100 milliseconds to follow the access path instructions, while the system takes 1,000 milliseconds to follow the updated access path instructions, the updated access path instructions may experience an application degradation. In another instance, the updated access paths may increase the required resources to perform the expected operation. In this way, the application degradation may relate to the increase in resources consumed during operation of the process.

In some embodiments, the degradation determination system will train the artificial intelligence model based on determining that the one or more updated access paths experience one or more applications.

As shown in block 210, the process flow 200 of this embodiment includes implementing one or more degradation solutions for the one or more application degradations to an artificial intelligence model. As used herein, the degradation solutions may include solutions that correct the application degradations. In some embodiments, the degradation solutions may include solutions to reduce or eliminate inefficiencies in the updated access paths. In some embodiments, the degradation solutions may include reviewing SQL commands, reviewing indexes, using optimization tools, collecting statistics related to the update, and/or the like. For instance, and by way of non-limiting example, the degradation solutions may relate to a reducing the resources consumed in response to the updated access paths. In this way, the degradation solutions may correct the issues (e.g., application degradations, overconsumption of resources, and/or the like) associated with the application degradations.

In some embodiments, the degradation determination system may deploy the artificial intelligence model into the production environment. As used herein, deploying may include any processes required for the deployment of the artificial intelligence model into the production environment. In some embodiments, deploying may include implementing, integrating (e.g., integrating with existing production systems), scaling (e.g., ensuring capability of handling increased load), monitoring (e.g., monitoring the system's performance after deployment), updating (e.g., retraining, upgrading, reconfiguring system parameters from time to time), versioning (e.g., detailing reasons for updated model(s) and parameter(s)), and/or the like.

In some embodiments, the degradation determination system may train, on a regular interval, the artificial intelligence model. As used herein, "train" may refer to any training, configuring, reconfiguring, and/or the like, the artificial intelligence model so the artificial intelligence model may perceive, interpret, learn, and/or the like. In some embodiments, the artificial intelligence model may be trained with data that has been previously used in the system (e.g., old data). In some embodiments, the artificial intelligence model may be trained with data that has not been previously used in the system (e.g., new data). In some embodiments, the artificial intelligence model may be trained with a combination of old and new data.

As used herein, a "regular interval" may be any interval appropriate for training the artificial intelligence model. In some embodiments, the regular interval may include training the artificial intelligence model on a continuous basis. In some embodiments, the interval may be based upon a timeframe interval (e.g., years, months, weeks, days, hours, minutes, seconds, and/or the like), a maintenance interval (e.g., based upon certain performance metrics of the system, or the like), a system usage interval (e.g., based upon a certain number of uses or operations of the system, or the like), a fault interval (e.g., based upon the system performing below an expected or accepted level of performance), and/or the like.

In some embodiments, training the artificial intelligence model may include the artificial model self-learning (e.g., self-correcting, or the like). In some embodiments, self-learning may include training the artificial intelligence model in the development environment with processes and operations performed in the production environment. In this way, the artificial intelligence model in the production environment may teach the artificial intelligence model in the development environment one or more degradation solutions that correct application degradations. For instance, and by way of non-limiting example, the artificial intelligence model may create a self-learning feedback loop in response to degradation solutions learned in the production environment to teach in the development environment, or vice versa.

In some embodiments, determination application degradation using advanced computational models for data analysis and automated decision making may include determining an amount of resources required to implement the one or more degradation solutions. In some embodiments, the amount of resources may refer to computing resources such as processing resources, storage resources, network resources, and/or the like. In some embodiments, the resources may include human resources associated with operating (e.g., implementing) the degradation determination system (e.g., manual operation of the system, or the like).

In some embodiments, determination application degradation using advanced computational models for data analysis and automated decision making may include conserving one or more resources associated with implementing the one or more degradation solutions to the artificial intelligence model. In some embodiments, the degradation determination system may conserve the one or more resources in response to one or more optimization techniques implemented in the degradation determination system. In this way, optimizing the degradation determination system may include reconfiguring existing processes to become more efficient and effective. In some embodiments, optimizing the degradation determination system may include configuring new processes that reduce the resources consumed.

In some embodiments, the degradation determination system may reconfigure existing processes in response to training the artificial intelligence model. In this way, the artificial intelligence model may incorporate the optimization techniques that reduce resources consumed throughout the entire operation. For instance, and by way of non-limiting example, optimizing the artificial intelligence model may include reconfiguring the artificial intelligence model to more efficiently identify application degradations and/or degradation solutions.

FIG. 3 is a process flow 300 which illustrates a process flow for comparing historical performance characteristics and performance characteristics, in accordance with an embodiment of the disclosure. The method may be carried out by various components of the distributed computing environment 100 discussed herein (e.g., the system 130, or one or more end-point device(s) 140, etc.). An example system may include at least one processing device and at least one non-transitory storage device containing instructions that, when executed by the processing device, causes the processing device to perform the method discussed herein.

In some embodiments, a degradation determination system (e.g., similar to one or more of the systems described herein with respect to FIGS. 1A-1C) may perform one or more of the steps of process flow 300. For example, a degradation determination system (e.g., the system 130 described herein with respect to FIGS. 1A-1C) may perform the steps of process flow 300.

As shown in block 302, the process flow 300 of this embodiment includes comparing the one or more access paths and the one or more updated access paths. In some embodiments, the degradation determination system may compare the access paths by comparing any number of forms associated with the access paths. In this way, the degradation determination system may compare the same type of forms between the access paths and the updated access paths.

As shown in block 304, the process flow 300 of this embodiment includes receiving historical performance characteristics associated with the one or more access paths. As used herein, historical performance characteristics may refer to performance characteristics associated with the one or more access paths before the access paths have been updated. In some embodiments, the historical performance characteristics may relate to the consumption of resources required for the respective access paths. For instance, and by way of non-limiting example, the historical performance characteristics may indicate how many resources (e.g., computing resources, memory resources, networking resources, and/or the like) were consumed while using the access paths. In some embodiments, the historical performance characteristics may include the cost of access (e.g., resources required when using the access paths), response time or latency (e.g., time required for retrieval using the access paths), concurrency (e.g., amount of simultaneous operations handled by the system), locking (e.g., locking of data), duplicative values (e.g., level of distinctive data), buffering and caching (e.g., ability to use buffer memory or cache efficiently during operation), predictability (e.g., how easily the operation can be anticipated by the system), and/or the like.

As shown in block 306, the process flow 300 of this embodiment includes receiving performance characteristics associated with the one or more updated access paths. As used herein, the performance characteristics associated with the one or more updated access paths may be similar to the historical performance characteristics associated with the one or more access paths (e.g., non-updated access paths). In this way, the degradation determination system may receive different values for the same performance characteristics. For instance, and by way of non-limiting example, the degradation determination system may receive a historical performance characteristic that relates to the resources consumed and the response time for a particular access path. The degradation determination system may also receive the performance characteristics (e.g., resources consumed and response time) for a particular updated access path (e.g., the particular access path after it has been updated).

As shown in block 308, the process flow 300 of this embodiment includes comparing the historical performance characteristics and the performance characteristics. In some embodiments, the historical performance characteristics and the performance characteristics may be compared to illustrate the difference between the characteristics of the access paths and the updated access paths. In this way, the degradation determination system may determine that one or more updated access paths have experienced a degradation in response to the associated performance characteristics, as compared to the historical performance characteristics.

In some embodiments, the degradation determination system may determine a threshold value when comparing the historical performance characteristics and the performance characteristics. In this way, the threshold value may include a range that relates to an acceptable level of difference between the historical performance characteristics and the performance characteristics. For instance, and by way of non-limiting example, if a historical performance characteristic that relates to a response time is a first value, and a performance characteristic that also relates to a response time is a second value, the degradation determination system may determine that the second value is within the threshold value. In this way, the second value may be determined to be an acceptable response time (e.g., performance characteristic) without triggering an application degradation response by the system.

As shown in block 310, the process flow 300 of this embodiment includes identifying the one or more access paths that experience the one or more application degradations. In some embodiments, identifying application degradations may include identifying updated access paths whose performance characteristics are outside an acceptable level. For instance, and by way of non-limiting example, the performance characteristics of a particular updated access path may be different enough from historical performance characteristics of the access path (e.g., non-updated) to trigger identification of an application degradation. In some embodiments, identification of the application degradations may include a range of values for each of the performance characteristics that define an acceptable window (e.g., range of values) for the performance characteristics. In this way, the performance characteristics of the updated access paths may be required to be within an acceptance window.

As shown in block 312, the process flow 300 of this embodiment includes determining the one or more degradation solutions for the one or more application degradations. In some embodiments, determining degradation solutions may include reconfiguring access path details to increase efficiency and effectiveness of the one or more application degradations. For instance, and by way of non-limiting example, if an application degradation is determined to exist, the degradation determination system may reconfigure the access path details to limit the resources consumed, reduce response time or latency, reduce locking issues, reduce stability issues, and/or the like.

FIG. 4 is a process flow 400 which illustrates a process flow an example process associated with example embodiments described herein. The method may be carried out by various components of the distributed computing environment 100 discussed herein (e.g., the system 130, or one or more end-point device(s) 140, etc.). An example system may include at least one processing device and at least one non-transitory storage device containing instructions that, when executed by the processing device, causes the processing device to perform the method discussed herein.

In some embodiments, a degradation determination system (e.g., similar to one or more of the systems described herein with respect to FIGS. 1A-1C) may perform one or more of the steps of process flow 400. For example, a degradation determination system (e.g., the system 130 described herein with respect to FIGS. 1A-1C) may perform the steps of process flow 400.

As shown in block 402, the process flow 400 of this embodiment includes a production environment. In some embodiments, the production environment may include the environment in which the degradation determination system operates by receiving live, real-world data. In some embodiments, the production environment may be any environment where an entity managing the degradation determination system requires the degradation determination system to operate. For instance, and by way of non-limiting example, an entity may place the degradation determination system in an environment (e.g., production environment) that allows its users (e.g., customers, technicians, managers, suppliers, contractors, and/or the like) to use the degradation determination system.

As shown in block 404, the process flow 400 of this embodiment includes one or more applications. In some embodiments, the one or more application may include pre-updated access paths (e.g., access paths). In some embodiments, the pre-updated access paths (e.g., access paths) may include the access paths before the access paths have been updated (e.g., upgraded, configured, reconfigured, re-bound, and/or the like). In some embodiments, the pre-updated access paths may be within a DB2 database.

As shown in block 406, the process flow 400 of this embodiment includes a development environment. In some embodiments, the development environment may include an environment in which the degradation determination operates in an experimental state, a learning state, a maintenance state, and/or the like. In some embodiments, an entity may place the degradation determination system into an environment (e.g., development environment) that allows its users (e.g., technicians, managers, contractors, and/or the like) to perform configurations, reconfigurations, maintenance, and/ or the like on the degradation determination system. In this way, the development environment allows teaching and training of the degradation determination system.

As shown in block 408, the process flow 400 of this embodiment includes transferring the one or more applications. In some embodiments, transferring the one or more applications may include transferring pre-updated access paths (e.g., access paths). In some embodiments, transferring the pre-updated access paths may include transferring the pre-updated access paths to a development environment. In this way, the pre-updated access paths may be configured, reconfigured, and/or the like.

As shown in block 409, the process flow 400 of this embodiment includes pre updated access paths for one or more applications. In some embodiments, the pre-updated access paths for the one or more applications may include access paths that have not been updated (e.g., upgraded). In some embodiments, the pre updated access paths may be associated with the one or more applications. In some embodiments, the pre updated access paths may be associated with the original access path details. In some embodiments, the original (e.g., non-updated) access path details may be scheduled for an updated (e.g., upgrade) in the database management environment (e.g., DB2 environment).

As shown in block 410, the process flow 400 of this embodiment includes updating the access paths (e.g., updated access paths). In some embodiments, updating the access paths may include updating the pre-updated access paths (e.g., similar to block 404) to updated access paths. In some embodiments, updating the access paths may include re-binding the access paths in the DB2 database. In some embodiments, re-binding the access paths may include reconfiguring the access paths details for the access paths to become more efficient (e.g., reduce consumption of resources).

As shown in block 412, the process flow 400 of this embodiment includes determining application degradations. In some embodiments, determining application degradations may include comparing the performance characteristics and historical performance characteristics of pre-updated access paths and updated access paths. In this way, the degradation determination system may determine application degradations by analyzing the performance of the access paths pre-update and post-update.

As shown in block 414, the process flow 400 of this embodiment includes training the artificial intelligence model and implementing degradation solutions. In some embodiments, the artificial intelligence model may be trained in response to processes performed in the development environment (e.g., development environment 406). In some embodiments, the artificial intelligence model may be trained in response to degradation solutions implemented in the production environment (e.g., implement degradation solutions in production 416).

As shown in block 416, the process flow 400 of this embodiment includes implementing degradation solutions in the production environment. In some embodiments, implementing degradation solutions in the production environment may include implementing degradation solutions in response to the development environment (e.g., development environment 406). In some embodiments, the degradation solutions may be in response to the continuous customization and tuning (e.g., similar to block 418, discussed below). In some embodiments, the degradation solutions implemented in the production environment may be transferred to the artificial intelligence model in the development environment (e.g., development environment 406). In this way, the degradation determination system may continuously transfer degradation solutions between the production environment and the development environment systems.

As shown in block 418, the process flow 400 of this embodiment includes continuous customization and tuning. In some embodiments, the degradation determination system may continuously customize and tune the artificial intelligence model. In some embodiments, the continuous customization and tuning may happen in the production environment (e.g., production environment 402). In this way, the artificial intelligence model may continue to receive configurations, reconfigurations, and/or the like, while it is operating in the production environment.

FIG. 5 is a process flow 500 which illustrates a process flow of an example process associated with creating a repository to train the artificial intelligence model, in accordance with an embodiment of the disclosure. The method may be carried out by various components of the distributed computing environment 100 discussed herein (e.g., the system 130, or one or more end-point device(s) 140, etc.). An example system may include at least one processing device and at least one non-transitory storage device containing instructions that, when executed by the processing device, causes the processing device to perform the method discussed herein.

In some embodiments, a degradation determination system (e.g., similar to one or more of the systems described herein with respect to FIGS. 1A-1C) may perform one or more of the steps of process flow 500. For example, a degradation determination system (e.g., the system 130 described herein with respect to FIGS. 1A-1C) may perform the steps of process flow 500.

As shown in block 502, the process flow 500 of this embodiment includes application 1. In some embodiments, application 1 may include a variety of catalog information such as applications, programs, catalog information, catalog tables, and/or the like. In some embodiments, the applications may include system column statistics, system column distribution, system columns, system indexes, system index parts, system tables, system table spacing, system table spacing statistics, system index spacing statistics, system routines, and/or the like.

As shown in block 504, the process flow 500 of this embodiment includes application 2. In some embodiments, application 2 may include a variety of catalog information such as applications, programs, catalog information, catalog tables, and/or the like, as mentioned above.

As shown in block 506, the process flow 500 of this embodiment includes application 3. In some embodiments, application 3 may include a variety of catalog information such as applications, programs, catalog information, catalog tables, and/or the like, as mentioned above.

As shown in block 508, the process flow 500 of this embodiment includes application N. In some embodiments, application N may include a variety of catalog information such as applications, programs, catalog information, catalog tables, and/or the like, as mentioned above.

As shown in block 510, the process flow 500 of this embodiment includes access path data 1. In some embodiments, access path data 1 may include a variety of access path information.

As shown in block 512, the process flow 500 of this embodiment includes access path data 2. In some embodiments, access path data 2 may include a variety of access path information.

As shown in block 514, the process flow 500 of this embodiment includes access path data N. In some embodiments, access path data N may include a variety of access path information.

As shown in block 516, the process flow 500 of this embodiment includes an artificial intelligence model repository. In some embodiments, the degradation determination system may extract the one or more applications. In some embodiments, the degradation determination system may extract the catalog information associated with the one or more applications (e.g., system column statistics, system column distribution, system columns, etc.). In some embodiments, the degradation determination system may prepare the one or more access paths for training the artificial intelligence model. In some embodiments, the degradation determination system may prepare the one or more access paths for updating. In some embodiments, preparing the one or more access paths may include determining how the access paths are accessed, wherein determining how the access paths are accessed may include specifying accessibility information associated with the access paths. For instance, and by way of non-limiting example, the accessibility information may include the specific indexes and tables accessed, the access methods used, the order of accessing the access paths, and/or the like.

In some embodiments, preparing the one or more access paths may include extracting degradation information, wherein degradation information is associated with applications that have degraded post-update. In this way, the degradation information may provide training for the artificial intelligence model to identify applications that have degraded in performance after the applications have been updated in the production environment.

In some embodiments, the degradation information may be stored in a repository, wherein the repository may be used to train the artificial intelligence model. In some embodiments, the degradation information may include the cardinality of tables and columns (e.g., distinct values), the number of pages used in a table, clustering, cluster ratio, data repeat factor, first key cardinality, full key cardinality, and/or the like. Further, the degradation information may also include the number of leaf pages in an index, a number of index levels, and/or the like, which may be stored in the repository.

In some embodiments, the degradation determination system may transfer the applications, catalog information, access path information, and/or the like to an artificial intelligence model repository. In some embodiments, the artificial intelligence model repository may store the transferred data (e.g., applications, catalog information, access path information, and/or the like). In some embodiments the artificial intelligence model repository may train the artificial intelligence model with the transferred data.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for determining application degradation using advanced computational models for data analysis and automated decision making, the system comprising:
   a processing device;
   a non-transitory storage device containing instructions when executed by the processing device, causes the processing device to perform the steps of:
      receive one or more applications, wherein the applications are stored in a relational database, wherein the one or more applications comprise one or more access paths, wherein the one or more access paths provide information on how to access the one or more applications, and wherein receiving the one or more applications comprises transferring the one or more applications from a production environment to a development environment;

update the one or more access paths, wherein updating the one or more access paths comprises reconfiguring details associated with the access paths;

create, in response to updating the one or more access paths, updated access paths;

determine that the one or more updated access paths experience one or more application degradations, wherein the application degradations comprise a reduction in performance of the applications; and implement one or more degradation solutions for the one or more application degradations to an artificial intelligence model.

2. The system of claim 1, wherein determining that the updated access paths experience one or more application degradations further comprises:

comparing the one or more access paths and the one or more updated access paths;

identifying the one or more access paths that experience the one or more application degradations; and determining the one or more degradation solutions for the one or more application degradations.

3. The system of claim 2, wherein comparing the one or more access paths and the one or more updated access paths further comprises:

receiving historical performance characteristics associated with the one or more access paths;

receiving performance characteristics associated with the one or more updated access paths; and comparing the historical performance characteristics and the performance characteristics.

4. The system of claim 1, wherein executing the instructions further causes the processing device to deploy the artificial intelligence model into the production environment.

5. The system of claim 4, wherein executing the instructions further causes the processing device to train, on a regular interval, the artificial intelligence model.

6. The system of claim 1, wherein determining application degradation using advanced computational models for data analysis and automated decision making further comprises:

determining an amount of resources required to implement the one or more degradation solutions; and conserving one or more resources associated with implementing the one or more degradation solutions to the artificial intelligence model.

7. A computer program product for determining application degradation using advanced computational models for data analysis and automated decision making, the computer program product comprising a non-transitory computer-readable medium comprising code causing an apparatus to:

receive one or more applications, wherein the applications are stored in a relational database, wherein the one or more applications comprise one or more access paths, wherein the one or more access paths provide information on how to access the one or more applications, and wherein receiving the one or more applications comprises transferring the one or more applications from a production environment to a development environment;

update the one or more access paths, wherein updating the one or more access paths comprises reconfiguring details associated with the access paths;

create, in response to updating the one or more access paths, updated access paths;

determine that the one or more updated access paths experience one or more application degradations, wherein the application degradations comprise a reduction in performance of the applications; and implement one or more degradation solutions for the one or more application degradations to an artificial intelligence model.

8. The computer program product of claim 7, wherein determining that the updated access paths experience one or more application degradations further comprises:

comparing the one or more access paths and the one or more updated access paths;

identifying the one or more access paths that experience the one or more application degradations; and determining the one or more degradation solutions for the one or more application degradations.

9. The computer program product of claim 8, wherein comparing the one or more access paths and the one or more updated access paths further comprises:

receiving historical performance characteristics associated with the one or more access paths;

receiving performance characteristics associated with the one or more updated access paths; and comparing the historical performance characteristics and the performance characteristics.

10. The computer program product of claim 7, wherein the code further causes the apparatus to deploy the artificial intelligence model into the production environment.

11. The computer program product of claim 10, wherein the code further causes the apparatus to train, on a regular interval, the artificial intelligence model.

12. The computer program product of claim 7, wherein determining application degradation using advanced computational models for data analysis and automated decision making further comprises:

determining an amount of resources required to implement the one or more degradation solutions; and conserving one or more resources associated with implementing the one or more degradation solutions to the artificial intelligence model.

13. A method for determining application degradation using advanced computational models for data analysis and automated decision making, the method comprising:

receiving one or more applications, wherein the applications are stored in a relational database, wherein the one or more applications comprise one or more access paths, wherein the one or more access paths provide information on how to access the one or more applications, and wherein receiving the one or more applications comprises transferring the one or more applications from a production environment to a development environment;

updating the one or more access paths, wherein updating the one or more access paths comprises reconfiguring details associated with the access paths;

creating, in response to updating the one or more access paths, updated access paths;

determining that the one or more updated access paths experience one or more application degradations, wherein the application degradations comprise a reduction in performance of the applications; and implementing one or more degradation solutions for the one or more application degradations to an artificial intelligence model.

14. The method of claim 13, wherein determining that the updated access paths experience one or more application degradations further comprises:

comparing the one or more access paths and the one or more updated access paths;

identifying the one or more access paths that experience the one or more application degradations; and determining the one or more degradation solutions for the one or more application degradations.

15. The method of claim 14, wherein comparing the one or more access paths and the one or more updated access paths further comprises:

receiving historical performance characteristics associated with the one or more access paths;

receiving performance characteristics associated with the one or more updated access paths; and comparing the historical performance characteristics and the performance characteristics.

16. The method of claim 13, wherein the method further comprises deploying the artificial intelligence model into the production environment.

17. The method of claim 16, wherein the method further comprises training, on a regular interval, the artificial intelligence model.

* * * * *